June 27, 1950   W. J. S. JOHNSON   2,512,941
LOCKING TYPE CASTER
Filed March 29, 1948

INVENTOR.
WALLACE J. S. JOHNSON
BY
Mellin and Hanscom
ATTORNEYS

Patented June 27, 1950

2,512,941

UNITED STATES PATENT OFFICE 2,512,941

LOCKING TYPE CASTER

Wallace J. S. Johnson, Berkeley, Calif.

Application March 29, 1948, Serial No. 17,687

4 Claims. (Cl. 16—35)

This invention relates to a caster or the like which can be locked against radial and pivotal movement, and more particularly to a caster of such character for use with scaffolding.

In scaffolding and other structures, it is frequently desirable to provide a wheel support of free wheeling character, in which each wheel is capable of considerable independent movement. Thus, it is common to provide a caster wherein the caster wheel is supported eccentrically with respect to its spindle. This allows pivotal swivel movement of each caster about a circle determined by the spacing of the spindle axis and the wheel axis.

In such casters, however, it is also desirable to provide means for locking or braking the caster wheel, both against radial movement about its own axis and against pivotal movement about the spindle. Such means as have been devised heretofore for this purpose are disadvantageous for several reasons. For example, independent braking means for each movement are provided, thus complicating the structure and requiring greater attention to manipulation. Also, certain of the means heretofore used for the purpose are inherently undependable or become so as the result of wear during usage.

It is an object of this invention to provide a caster or the like which can be effectively and quickly locked or braked against both radial movement about its own axis and pivotal movement about its spindle axis.

It is a further object of the invention to provide a caster or the like embodying an improved connection between the caster wheel and the spindle.

It is a still further object of the invention to provide a caster or the like having an improved swivel connection for pivotally securing the caster to a leg of a scaffold or the like.

These and other objects of the invention will be apparent from the ensuing description and the appended claims.

The invention will be better understood by reference to the accompanying drawings, in which one form of the invention is shown. In these drawings.

Figure 1:
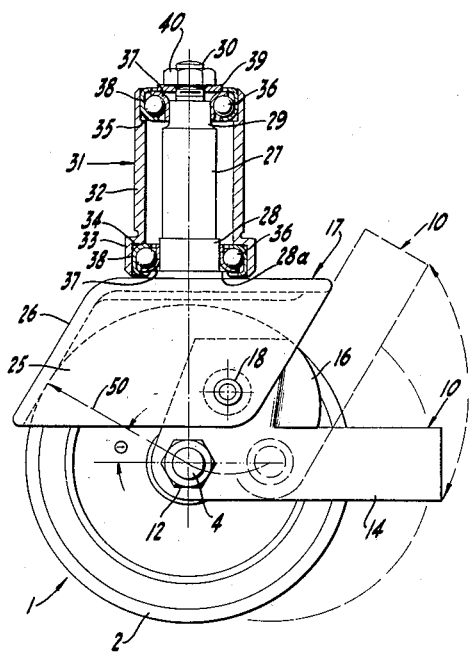
Fig. 1 is a side view, partly in elevation and partly in section.
Figure 2:
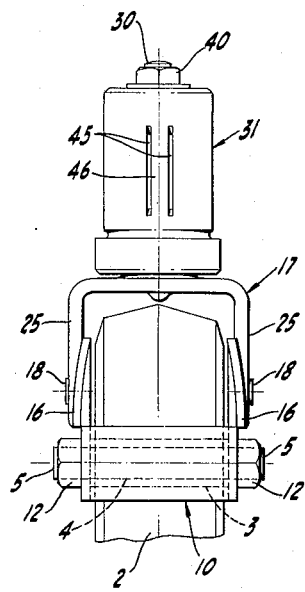
Fig. 2 is fragmentary end view in elevation.

Referring now to the drawings, a caster wheel 1 having a rubber tire 2 is rotatably mounted on a hollow axle 3 through which passes a stud 4 having threaded ends 5 projecting from each side of the wheel. The caster wheel is clamped to the axle by means of a combined connecting member and brake lever 10. The member 10 is provided with aligned holes 11 to receive the ends of the stud 4, and it is secured in place and clamping is effected by means of lock nuts 12 threaded over the ends of the stud.

Figure 3:
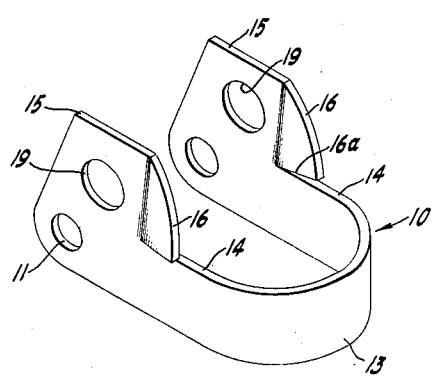
Fig. 3 is a perspective view of the wheel connecting member and brake lever.

The member 10 is of generally U-shape, having a base 13 and legs 14, the legs extending upwardly at their free or rearward ends to form ears 15. The legs 14 are also slit at 16a, as shown, a distance rearwardly of the leading edge of each ear, and the slit portions are bent outwardly, as shown more clearly in Fig. 3, to provide lugs 16 for a purpose described hereinafter.

The caster wheel assembly as thus far described is pivotally mounted on a generally U-shaped caster housing 17 by means of rivets 18 or any other suitable pivotal connections extending through aligned holes 19 formed in the ears 15 of the member 10 and through complemental holes (not shown) formed in the caster housing.

As shown, the side walls 25 of the housing are generally in the form of parallelograms, the front portion of the housing is open and the rear wall 26 of the housing slopes downwardly and rearwardly for a purpose described hereinafter.

A spindle 27 is provided, which is preferably integral with the caster wheel housing or is welded or otherwise rigidly secured thereto against pivotal movement. The spindle is stepped, as shown, to provide a base portion 28 of widest diameter and having a shoulder 28a, an upper portion 29 of lesser diameter and a threaded end portion 30. A bearing structure generally designated as 31 is also provided. This bearing structure comprises a housing 32 having an outwardly projecting annular portion or collar 33 at its lower end, defining a lower bearing recess 34, and an upper bearing recess 35 at its upper end. The housing 32 is also slotted longitudinally to provide parallel slots 45, and the segment 46 lying between the slots is bulged out, for a purpose hereinafter described. Ball bearings 36 are retained within the bearing recesses 34 and 35 by means of inner and outer bearing retainers 37 and 38, as shown. A washer 39 and a lock nut 40 threaded onto the upper threaded portion of the spindle, secure the bearing structure in place.

The bearing housing 32 provides a means of engaging the hollow supporting leg (not shown) of a scaffold or the like. The hollow leg is merely slipped over the bearing housing to frictionally engage the same and to bear against the collar 33.

The frictional engagement is greatly augmented by the bulged segment 46. With the brake lever 10 in upward position as shown in broken lines in Fig. 1, the caster wheel 1 will be eccentric with respect to the spindle axis and, accordingly, is capable of pivotal movement about that axis and is also capable of radial movement about its own axis. When it is desired to lock the caster wheel, it is merely necessary to depress the brake lever to the position shown in full lines. This single operation results in pivoting the caster wheel about the pivot 18, causing the tire 2 to bear against the rear wall 26 of the caster wheel housing (which locks or brakes the wheel against radial movement), and it also results in aligning the caster wheel with its axis intersecting the axis of the spindle. Hence, not only is the caster wheel locked against radial movement about its own axis, but it is also locked against pivotal movement about the spindle. Of importance, also, is the fact that the braking force exerted on the caster wheel is proportional to the load on the caster. Thus, in a caster of the character described, wherein the angle $\theta$ formed by the horizontal and a radial line 50 passing through the point of tangency of the caster wheel and its housing, is 30°, the braking force is one-half the load on the caster. Another feature of importance is that the braking force is not diminished by wear of the tire 2.

A further advantage provided by the structure thus described is, that the lugs 16 formed on the brake lever frictionally engage the side walls 25 of the caster wheel housing when the brake lever is in upward position, thus securing the brake lever and the caster wheel against accidental release to locking position when such is not desired.

Other advantages of the structure are the integral connection between the spindle 27 and the caster wheel housing 25, which solves one of the most troublesome problems in caster construction; a vertical instead of a horizontal spacing of the bearing elements, which provides additional strength; the wide spacing of the bearings, which also adds to the strength of the structure; and the provision of a bulged segment on the bearing housing to frictionally engage the interior surface of a tubular leg of a scaffold or the like.

While I have shown the preferred form of my invention, it is to be understood that various changes may be made in its construction by those skilled in the art without departing from the spirit of the invention as defined in the appended claims.

Having thus described my invention, what I claim and desire to obtain by Letters Patent is:

1. A caster structure comprising a spindle; a wheel support secured to and depending from the lower end of said spindle and having spaced side walls and a downwardly and a rearwardly slanting rear wall; a wheel disposed between said side walls; and a connecting member on each side of said wheel rotatably and axially connected to the wheel and pivotally connected to the adjacent side wall of the wheel support whereby said wheel may be pivoted from a first and rearward position wherein the wheel and spindle axes intersect to a second and forward position wherein said axes do not intersect; said rear wall of the wheel support being so disposed as to engage and brake the rim of the wheel when the wheel is in said first position.

2. A caster structure comprising a spindle; a wheel support secured to and depending from the lower end of said spindle and having spaced side walls and a downwardly and a rearwardly slanting rear wall; a wheel disposed between said side walls with its axis perpendicular to the spindle axis; and a bifurcated U-shaped connecting member having legs disposed radially of the wheel and extending forwardly thereof and having a base connecting the outer ends of said legs, said legs being rotatably and axially connected to said wheel and being pivotally connected to said wheel support whereby said wheel may be pivoted from a first position wherein the wheel and spindle axes intersect and the rim of the wheel bears against the rear wall of said support, to a second position wherein said axes do not intersect.

3. The device of claim 2, wherein at least one of the legs of said connecting member is provided with an outwardly extending member adapted to frictionally engage the inner surface of the adjacent side wall of said wheel support when said wheel is in said second position.

4. A caster structure of the character described comprising a spindle, wheel supporting means fixed to and depending from the spindle, a wheel, wheel mounting means mounting the wheel on said wheel supporting means for pivotal movement between a first position in which the wheel and spindle axes intersect and a second position wherein said axes do not intersect, and latching means for latching said wheel in either position comprising a frictional member fixed to the wheel supporting means and operable to frictionally engage the rim of the wheel when in said first position and a frictional member fixed to the wheel mounting means operable to frictionally engage the wheel supporting means when the wheel is in said second position.

WALLACE J. S. JOHNSON.

REFERENCES CITED

The following references are of record in the file of this patent:

UNITED STATES PATENTS

| Number | Name | Date |
| --- | --- | --- |
| 1,160,121 | Allen | Nov. 16, 1915 |
| 1,392,911 | Chesnutt | Oct. 11, 1921 |
| 1,778,167 | Roe | Oct. 14, 1930 |
| 2,096,229 | Dudley | Oct. 19, 1937 |